(No Model.) 2 Sheets—Sheet 1.

J. MANN.
STONE DRESSING MACHINE.

No. 350,543. Patented Oct. 12, 1886.

Witnesses,
J. J. Maloney
Chr. R. Bates

Inventor,
Jonathan Mann,
by Jos. P. Livermore
Atty.

N. PETERS, Photo-Lithographer, Washington, D. C.

(No Model.) 2 Sheets—Sheet 2.

J. MANN.
STONE DRESSING MACHINE.

No. 350,543. Patented Oct. 12, 1886.

Witnesses,
J. J. Maloney
Ch. P. Bates.

Inventor
Jonathan Mann
by Jos. P. Livermore
Att'y.

UNITED STATES PATENT OFFICE.

JONATHAN MANN, OF MILTON, MASSACHUSETTS.

STONE-DRESSING MACHINE.

SPECIFICATION forming part of Letters Patent No. 350,543, dated October 12, 1886.

Application filed March 1, 1886. Serial No. 193,547. (No model.)

*To all whom it may concern:*

Be it known that I, JONATHAN MANN, of Milton, county of Norfolk, State of Massachusetts, have invented an Improvement in Stone-Dressing Machines, of which the following description, in connection with the accompanying drawings, is a specification, like letters on the drawings representing like parts.

The object of my invention is to produce a stone-dressing machine at much less expense than the machines commonly used for this class of work; and the invention is embodied in a machine provided with appliances for performing all the operations on a stone surface that are commonly performed by hand, but with much greater speed and without requiring skilled labor. The machine comprises a traveling carriage or platform upon which the stone is supported and fed to the various tools that are to operate upon it, and a vertically-adjustable cross-head which supports the various tools and their actuating and controlling mechanism. The different tools are mounted upon a series of pivoted arms which are acted upon by a shaft provided with a series of projections which oscillate the said arms one after another, raising the tools connected with the ends thereof and then permitting them to drop and strike a blow upon the surface of the stone. The said tools comprise a series of points or chipping-hammers which remove the projecting parts of the stone as it comes from the quarry, bringing it to a general level surface; and the machine also contains a series of peen-hammers and a series of bush-hammers for finishing the surface left by the points; and it also contains a set and chisel properly arranged to cut or trim the corners and edges of the stone and finish the same without breaking off the edges.

Figure 1:
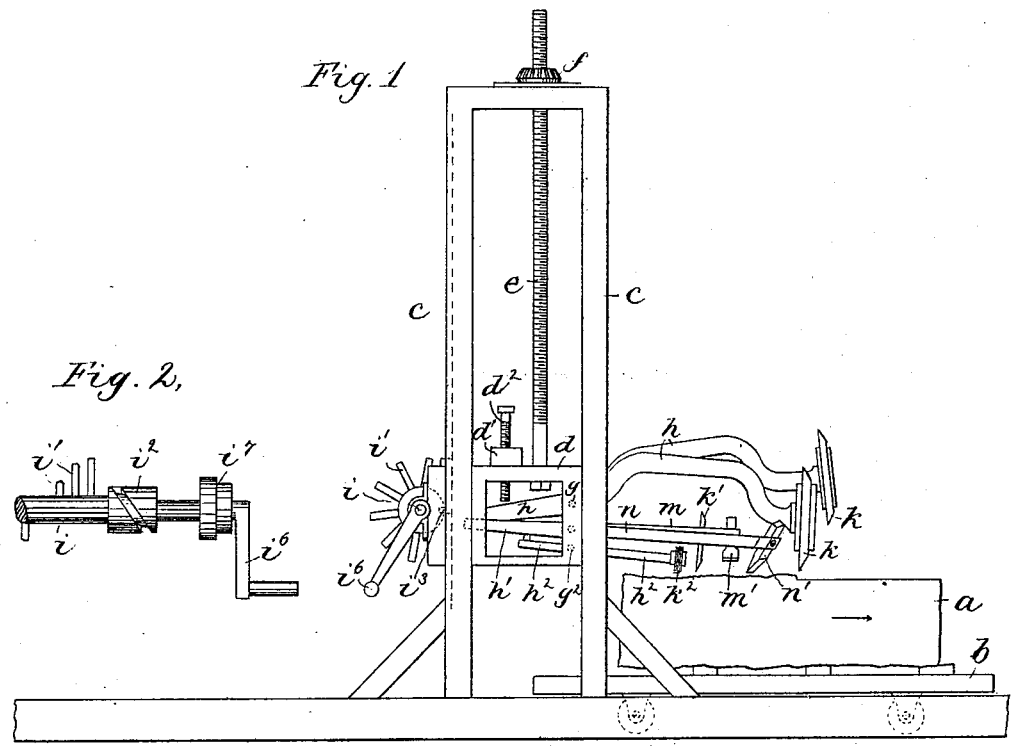
Figure 2:
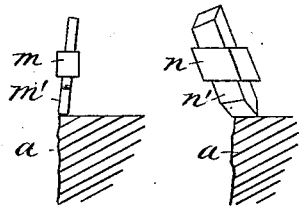
Figures 6, 7, 8:
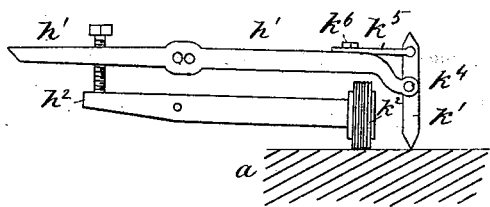
Figure 3:
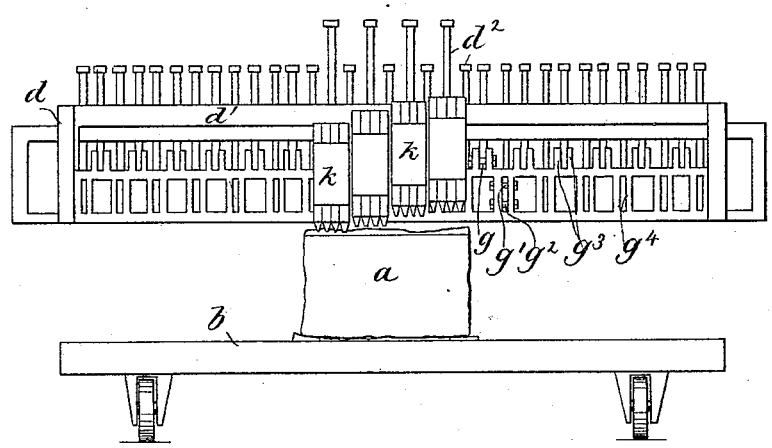
Figure 4:
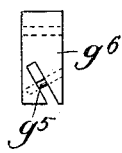
Figure 5:
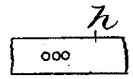

Figure 1 is a side elevation of a stone-dressing machine made in accordance with this invention; Fig. 2, a detail of the actuating-shaft; Fig. 3, a partial front elevation of the machine; Fig. 4, a detail showing the bearing for the arm of the edge-dressing chisel in front elevation detached; Fig. 5, a detail of the pivot or fulcrum portion of one of the tool-carrying arms; Figs. 6 and 7, details showing in front view the set and edge-finishing chisel and their relation to the stone; Fig. 8, a side elevation of one of the peen and one of the bush hammers detached, and Fig. 9 a detail showing a modified arrangement of the different tools and their relation to the surface of the stone in plan view.

The stone $a$ to be cut is mounted on the usual carriage, $b$, having a slow movement, produced by any suitable or usual mechanism, for feeding the stone gradually toward the different tools. The stone in its feeding movement passes through an upright frame, $c$, which forms a guide for a vertically-moving frame or cross-head, $d$, which may be raised and lowered by any suitable mechanism—such, for instance, as the usual threaded shaft, $e$, and nut $f$ thereon.

The cross-head $d$ is provided with bearings for the pivots $g\ g'\ g^2$ (see Fig. 3) of the rocking arms or levers $h\ h'\ h^2$, which carry the different tools. The pivots for the different arms are shown as bolts passing through suitable lugs, $g^3\ g^4$, (see Fig. 3,) on a transverse member of the cross-head, $d$, so that the arms may be readily taken out and other ones having tools of different character substituted, and the arms $h\ h'$, &c., are preferably provided with two or more pivot-holes, as shown in Figs. 5 and 8, so that their effective length may be varied for the purpose of varying the strength of the blow struck upon the stone.

The tool-carrying arms are actuated by a shaft, $i$, having its bearings on the cross-head $d$, provided with projections $i'$, arranged in different angular positions around the shaft, and one in line with each of the said arms, so that in the rotation of the shaft the arms are tilted one after another, so as to raise the tools carried by them up from the stone and permit them to drop and strike the stone with an effect substantially the same as if the tool were held against the stone and struck by a hammer, as in usual hand-labor.

The force of the blow of the hammers or points and other tools may be varied both by changing the relative lengths of the lever-arms by means of the different pivot-sockets, (shown in Fig. 5,) and also by raising and lowering the cross-head with relation to the stone, since the projections $i'$ of the actuating-shaft cause the hammers to rise a certain distance above the cross-head, and they will consequently fall farther before reaching the stone and strike a heavier blow the higher the cross-head is supported above the stone.

The arms $h$ are provided with points $k$, which act on the rough suface of the stone and reduce it to a level surface.

The different tools may be set in a single line across the stone, as indicated in Fig. 3, in which case, as it is impracticable to have the different hammer-heads or tools work close together, side by side, the entire cross-head $d$ may be caused to have a slight to-and-fro lateral movement, so as to act on the entire width of the stone. This lateral movement should be slightly greater than the distance between the different tools, measured transversely to the stone, and may be produced by a cam, $i^2$, (see Fig. 2,) on the shaft $i$, co-operating with a projection, $i^3$, (shown in dotted lines, Fig. 1,) which moves vertically with the cross-head $d$, working in a groove in the upright $c$, so that it has no movement transverse to the said upright.

The supporting-nuts for the threaded shafts $e$ may rest on bearing-plates having a slight movement on the upright $c$, transverse to the stone.

Figure 9:
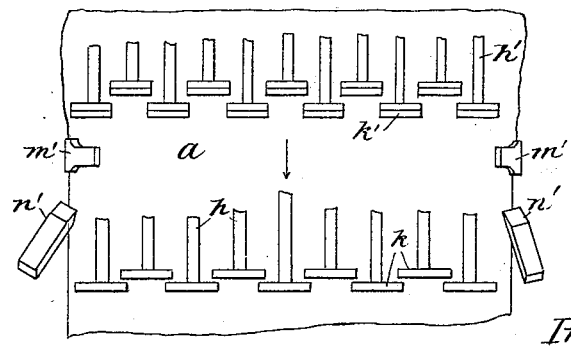

Other mechanism may be employed to produce the transverse movement of the cross-head; or, if desired, the cross-head may have no transverse movement, in which case the tools of each class will be arranged in two rows across the stone, as shown in Fig. 9, one tool of each row slightly overlapping the space between the two adjacent tools of the other row, so that both rows act on the entire width of the stone.

The arms $h$ carrying the points are the longest, as these tools have to do the hardest work, and the arms are preferably turned upward or arched, as shown in Fig. 1, so as to permit the other tools to work below them.

The cross-head $d$ is provided with a beam, $d'$, having a number of stops, $d^2$, which are vertically adjustable, and may be set to limit the downward movement of the tool-carrying arms, so that none of the tools will cut to too great a depth into the stone, and a portion of the said stops may be turned down, so as to raise the corresponding tools from the surface of the stone and hold their arms out of reach of the projections $i'$ of the actuating-shaft, so that such tools will not be operated; and in practice the finishing-tools may be retained inoperative while the stone is being acted upon by the points and then the points retained inoperative while the stone is fed through the second time and acted upon by the finishing-tools, and any desired number of tools may be set in operation while the remainder are inoperative.

The finishing-tools consist of a series of peen-hammers, $k'$, carried by the arms $h'$, and series of bush-hammers $k^2$, carried by the arms $h^2$, which, as shown in this instance, are actuated by the arms of the peen-hammers, instead of being actuated directly by the projections $i'$ on the shaft $i$.

The machine is also provided with an arm, $m$, or tool having a flat striking-face with a straight edge parallel with the line of movement of the stone, having a set, $m'$, which strikes on the stone near its edge and chips off portions of the side of the stone, so as to produce a straight edge on the upper surface thereof, and the upper surface near the edge is acted upon by a finishing-chisel, $n'$, carried by an arm, $n$, and inclined, as shown, so that it strikes inward toward the upper surface of the stone and across the upper edge thereof, as is necessary to avoid danger of crumbling the edge, which would be likely to be done if the vertically-acting point-tools $k$ overhung the edge of the stone.

The cross-head $d$ can have no transverse movement while the set $m'$ and edge-finishing chisel $n'$ are operating, and the projection $i^3$ will consequently have to be raised out of engagement with the cam $i^2$ and the cross-head locked against the transverse movement while these tools are operating.

The axis or pivot on which the arm $n$ turns may be inclined, as shown at $g^5$, Fig. 4, to cause the chisel to strike with a downward and lateral movement upon the stone, and the said pivot is shown as connected with a block, $g$, which may be secured between the lugs $g^3$ or $g^6$ on the cross-head at any desired point, according to the width of the stone.

The position of the set and edge-dressing tools with relation to the stone is best shown in Figs. 6 and 7.

The heads of the hammers or the tools may be pivoted upon their arms, as shown at $k^4$, Fig. 8, so that they may be oscillated in order to strike the surface of the stone at the desired angle, and when set at the proper angle they may be fastened by any suitable clamping device, (shown in Fig. 8,) as a link, $k^5$, connected with the hammer head or tool and fastened to the carrying-lever $h'$ by a bolt, $k^6$, passing through a slot in the said link $k^5$, to admit of the adjustment thereof.

The shaft $i$ may be provided with cranks $i^5$ and turned by hand, thus enabling one or two unskilled laborers to perform the work of dressing the stone much more rapidly than it could be done by skilled hand-labor; or, if desired, the shaft may be provided with pulleys $i^7$, (see Fig. 2,) or gearing, and actuated by steam or other power.

The point-tools $k$, although moving in a vertical plane, are set to strike upon the stone at an angle thereto, as shown in Fig. 1.

I claim—

1. A stone-dressing machine comprising a movable carriage or platform for the stone, and a series of stone-cutting tools and pivoted carrying-arms therefor, and an actuating-shaft for rocking the said arms and causing the tools to strike the surface of the stone, the said tools being arranged in different lines across the surface of the stone, and the carrying-arms of one line or series of tools arching over another line or series of tools, substantially as described.

2. In a stone-dressing machine, a movable bed or carriage for the stone, and series of pivoted tool-carrying arms and actuating-shaft therefor, one of the said arms being provided with a set which acts on the edge of the stone parallel with its line of movement, and another of the said arms being provided with a chisel arranged to act on the surface of the stone across the edge made by the set, the said chisel being inclined to the surface of the stone, substantially as and for the purpose described.

3. The combination of the vertically-adjustable cross-head with a series of stone-cutting tools and carrying-arms therefor pivoted in the said cross-head, and the actuating-shaft provided with projections that engage said arms, having its bearings in the said cross-head, and a series of stops, $d^2$, which engage the tool-carrying arms, by means of which stops the movement of the tools toward the stone may be limited, and by which stops a portion of the tool-carrying arms are held beyond the reach of the projections of the actuating-shaft, substantially as described.

4. The combination of the upright $c$ and cross-head $d$, vertically adjustable therein, with a series of tools and actuating-shaft therefor on the said cross-head, and the cam on said shaft, and projection $i^3$ co-operating therewith movable in a spline or groove in the upright, substantially as and for the purpose described.

5. The combination of the upright and cross-head vertically-adjustable therein, provided with a series of pivot-sockets and removable pivots, with a series of tools and shanks therefor mounted on said pivots, and the actuating-shaft provided with projections corresponding in position to said pivot-sockets, substantially as described.

6. In a stone-dressing machine, a movable bed or carriage for the stone, and a series of pivoted tool-carrying arms, and an actuating-shaft for vibrating the same, and a series of cutting-tools that act on the face of the stone to cut the same to a level surface, carried by a portion of said arms, and a set or tool, $m'$, having a flat striking-face with its edge parallel with the line of movement of the stone in feeding, carried by one of the said arms and located at the edge of the stone, the said tool acting to remove portions from the side of the stone beyond the edge of the tool, for the purpose of straightening the upper edge of the surface of the stone that is dressed by the other tools, substantially as described.

7. In a stone-dressing machine, a movable bed or carriage for the stone, and series of pivoted tool-carrying arms and actuating-shaft therefor, one of the said arms being provided with a chisel arranged to act on the surface of the stone, near the edge, the shank in the said chisel being mounted on a pivot that is inclined to the surface of the stone, substantially as and for the purpose described.

In testimony whereof I have signed my name to this specification in the presence of two subscribing witnesses.

JONATHAN MANN.

Witnesses:
 JOS. P. LIVERMORE,
 H. P. BATES.